(12) United States Patent
Fahn et al.

(10) Patent No.: US 10,223,688 B2
(45) Date of Patent: Mar. 5, 2019

(54) COMPETING MOBILE PAYMENT OFFERS

(71) Applicant: Samsung Electronics Company, Ltd., Suwon, Gyeonggi-Do (KR)

(72) Inventors: Paul N. Fahn, Sunnyvale, CA (US); Glen D. Stone, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 175 days.

(21) Appl. No.: 14/034,465

(22) Filed: Sep. 23, 2013

(65) Prior Publication Data

US 2014/0089119 A1 Mar. 27, 2014

Related U.S. Application Data

(60) Provisional application No. 61/705,025, filed on Sep. 24, 2012, provisional application No. 61/725,797, filed on Nov. 13, 2012.

(51) Int. Cl.
*G06Q 20/32* (2012.01)
*G06Q 20/40* (2012.01)

(52) U.S. Cl.
CPC ......... *G06Q 20/322* (2013.01); *G06Q 20/405* (2013.01)

(58) Field of Classification Search
USPC ........................................ 705/35, 38, 39, 21
See application file for complete search history.

(56) References Cited

U.S. PATENT DOCUMENTS

| | | | |
|---|---|---|---|
| 4,599,647 A | 7/1986 | George et al. | |
| 6,895,391 B1 | 5/2005 | Kausik | |
| 6,973,671 B1 | 12/2005 | Hsing et al. | |
| 7,003,677 B1 | 2/2006 | Herzberg et al. | |
| 7,362,869 B2 | 4/2008 | Landrock | |
| 7,380,137 B2 | 5/2008 | Bell | |
| 7,734,047 B2 | 6/2010 | Nakayama | |
| 7,983,994 B2 | 7/2011 | Hurry | |

(Continued)

FOREIGN PATENT DOCUMENTS

| CN | 101044489 A | 9/2007 |
|---|---|---|
| JP | 2005115706 A | 4/2005 |

(Continued)

OTHER PUBLICATIONS

European Extended Search Report dated Oct. 11, 2016 for European Application No. 14763512.2 from European Patent Office, pp. 1-8, Munich, Germany.

(Continued)

*Primary Examiner* — Scott A Zare
*Assistant Examiner* — Reva R Danzig
(74) *Attorney, Agent, or Firm* — Sherman IP LLP; Kenneth L. Sherman; Steven Laut

(57) ABSTRACT

A method for competing mobile payment offers includes presenting a payment request based on a purchase request to an electronic device. A transaction description based on the payment request is forwarded to one or more payment providers. One or more payment offers are received from the one or more payment providers on the electronic device. A payment method is selected for the purchase request based on the received one or more payment offers. The purchase request is completed using the selected payment method.

33 Claims, 9 Drawing Sheets

(56) References Cited

U.S. PATENT DOCUMENTS

| | | |
|---|---|---|
| 8,040,785 B2 | 10/2011 | Yamaoka |
| 8,165,635 B2 | 4/2012 | Khan |
| 8,438,063 B2 | 5/2013 | Albisu |
| 8,549,659 B2 | 10/2013 | Kang et al. |
| 8,566,168 B1 | 10/2013 | Bierbaum |
| 8,812,843 B2 | 8/2014 | Nagai et al. |
| 9,154,481 B1 | 10/2015 | Juels |
| 9,544,138 B2 | 1/2017 | Nagai et al. |
| 2002/0191788 A1 | 12/2002 | Inchalik |
| 2003/0018558 A1* | 1/2003 | Heffner .............. G06Q 40/02 705/37 |
| 2003/0198350 A1 | 10/2003 | Foster et al. |
| 2003/0221113 A1 | 11/2003 | Kupka et al. |
| 2004/0006699 A1 | 1/2004 | von Mueller et al. |
| 2004/0044739 A1 | 3/2004 | Ziegler |
| 2004/0088540 A1 | 5/2004 | Marturano et al. |
| 2004/0093305 A1 | 5/2004 | Kight et al. |
| 2004/0122754 A1 | 6/2004 | Stevens |
| 2005/0161502 A1 | 7/2005 | Smith et al. |
| 2005/0177517 A1 | 8/2005 | Leung et al. |
| 2006/0253620 A1 | 11/2006 | Kang et al. |
| 2007/0162413 A1 | 7/2007 | Sonetaka |
| 2007/0249323 A1 | 10/2007 | Lee et al. |
| 2007/0288766 A1 | 12/2007 | Kamio |
| 2008/0041943 A1 | 2/2008 | Radicella et al. |
| 2008/0154757 A1* | 6/2008 | Barros .............. G06Q 20/20 705/35 |
| 2008/0307223 A1 | 12/2008 | Brickell et al. |
| 2009/0022067 A1 | 1/2009 | Gotswals et al. |
| 2009/0037285 A1 | 2/2009 | Murphy |
| 2010/0293189 A1 | 11/2010 | Hammad |
| 2010/0332399 A1 | 12/2010 | Benson et al. |
| 2011/0153402 A1 | 6/2011 | Craig |
| 2011/0218849 A1* | 9/2011 | Rutigliano .......... G06Q 20/20 705/14.25 |
| 2012/0066774 A1 | 3/2012 | Kang et al. |
| 2012/0078735 A1 | 3/2012 | Bauer et al. |
| 2012/0150742 A1* | 6/2012 | Poon .............. G06Q 20/20 705/44 |
| 2012/0158580 A1 | 6/2012 | Eram et al. |
| 2012/0171992 A1 | 7/2012 | Cheong |
| 2013/0262291 A1* | 10/2013 | Ricci .............. G06Q 20/227 705/38 |
| 2014/0279115 A1 | 9/2014 | Verma et al. |
| 2014/0279566 A1 | 9/2014 | Verma et al. |

FOREIGN PATENT DOCUMENTS

| | | |
|---|---|---|
| JP | 2005251056 A | 9/2005 |
| JP | 2007193493 A | 8/2007 |
| JP | 2008262355 A | 10/2008 |
| JP | 2009140035 | 6/2009 |
| KR | 1020110111801 A | 10/2011 |
| KR | 1020110112594 A | 10/2011 |
| KR | 1020110128573 A | 11/2011 |
| KR | 1020120041038 A | 4/2012 |
| KR | 1020120076654 A | 4/2012 |
| KR | 10201200412 A | 5/2012 |
| KR | 1020120076692 A | 7/2012 |
| KR | 1020120108599 A | 10/2012 |
| WO | 2013028901 A2 | 2/2013 |

OTHER PUBLICATIONS

U.S. Non-Final Office Action for U.S. Appl. No. 14/015,611 dated Aug. 8, 2016.

Chinese Office Action dated May 3, 2018 for Chinese Patent Application No. 201480014281.4 from Chinese Patent Office, pp. 1-41, Beijing, China (English-language translation included pp. 1-26).

Techopedia—Definition of "magnetic stripe reader", https://www.techopedia.com/definition/14458/magnetic-stripe-reader (Year: 2018).

U.S. Final Office for U.S. Appl. No. 14/015,611 dated May 31, 2018.

International Search Report and Written Opinion dated Jun. 26, 2014 for International Application No. PCT/KR2014/02194 from Korean Intellectual Property Office, pp. 1-11, Daejeon, Republic of Korea.

U.S. Advisory Action for U.S. Appl. No. 14/015,611 dated Aug. 27, 2018.

U.S. Restriction Requirement for U.S. Appl. No. 13/841,282 dated Apr. 9, 2015.

U.S. Final Office Action for U.S. Appl. No. 14/015,611 dated Mar. 21, 2017.

Kissel, R., "Glossary of Key Information Security Terms", National Institute of Standards and Technology, May 2013, pp. 1-222, United States [downloaded from http://nvlpubs.nist.gov/nistpubs/ir/2013/NIST. IR. 7298r2.pdf on Sep. 8, 2017].

U.S. Non-Final Office for U.S. Appl. No. 14/015,611 dated Sep. 26, 2017.

Warren, C., "Google Reveals Mobile Payment System: Google Wallet", Mashable, May 26, 2011, pp. 1-4, Mashable.com, United States.

* cited by examiner

COMPETING MOBILE PAYMENT OFFERS

CROSS-REFERENCE TO RELATED APPLICATIONS

This application claims the priority benefit of U.S. Provisional Patent Application Ser. No. 61/705,025, filed Sep. 24, 2012, and U.S. Provisional Patent Application Ser. No. 61/725,797, filed Nov. 13, 2012, both incorporated herein by reference in their entirety.

TECHNICAL FIELD

One or more embodiments relate generally to mobile payment and, in particular, to competing mobile payment offers.

BACKGROUND

Credit card payment typically uses a four party payment system including the bank customer/cardholder that desires to obtain goods or services, a merchant or retailer that uses a point-of-service (POS) card reader and provides goods or services, the issuer (e.g., bank) that provides the customer with a means to pay for the goods or services (e.g., through billing, online payment options, etc.), and the Acquirer with whom the merchant interacts to receive funds for the goods or services.

SUMMARY

In one embodiment, a method provides for competing mobile payment offers. One embodiment comprises a method that includes presenting a payment request based on a purchase request to an electronic device. In one embodiment, a transaction description based on the payment request is forwarded to one or more payment providers. In one embodiment, one or more payment offers is received from the one or more payment providers on the electronic device. In one embodiment, a payment method is selected for the purchase request based on the received one or more payment offers. In one embodiment, the purchase request is completed using the selected payment method.

One embodiment provides a system for mobile payment. In one embodiment, an electronic device uses a payment application. In one embodiment, digital payment methods are stored in secured storage. In one embodiment, the payment application receives payment offers from one or more payment providers for a purchase request. In one embodiment, a communication interface passes payment method information from the mobile application for digital payment method purchases based on a selected payment offer.

Another embodiment provides a non-transitory computer-readable medium having instructions which when executed on a computer perform a method comprising: presenting a payment request based on a purchase request to an electronic device. In one embodiment, a transaction description based on the payment request is forwarded to one or more payment providers. In one embodiment, one or more payment offers is received from the one or more payment providers on the electronic device. In one embodiment, a payment method is selected for the purchase request based on the received one or more payment offers. In one embodiment, the purchase request is completed using the selected payment method.

These and other aspects and advantages of the embodiments will become apparent from the following detailed description, which, when taken in conjunction with the drawings, illustrate by way of example the principles of the embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
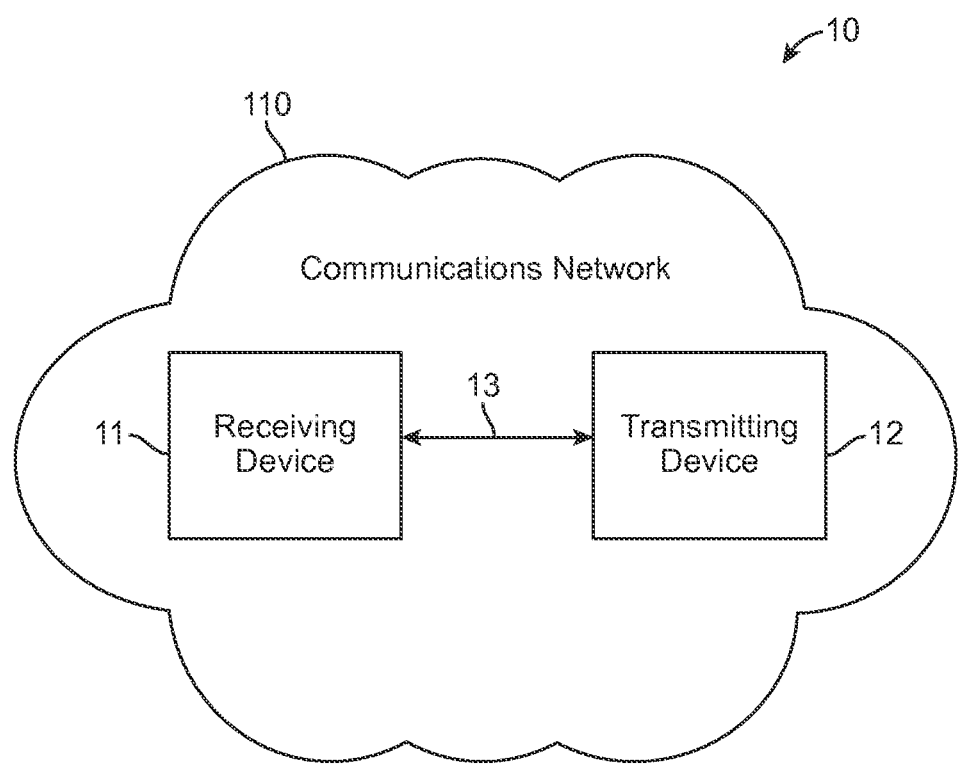
FIG. 1 shows a schematic view of a communications system, according to an embodiment.

The following description is made for the purpose of illustrating the general principles of the embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to competition for payment offers that may be used for purchases using a mobile device, such as a mobile smart phone, tablet computing device, wearable device, etc. In one embodiment, a point-of-service (POS) device may be used for purchases using an electronic device. One embodiment provides secured purchasing using digital credit card information for a selected credit card from a list of credit cards from an electronic wallet (e.g., e-wallet) using an electronic device.

In one embodiment, the electronic device comprises a mobile electronic device capable of data communication over a communication link, such as a wireless communication link. Examples of such mobile device include a mobile phone device, a mobile tablet device, a wearable device, etc.

In one embodiment, a method provides competing mobile payment offers using an electronic device. One embodiment comprises a method that includes presenting a payment request based on a purchase request to an electronic device. A transaction description based on the payment request is forwarded to one or more payment providers. One or more payment offers is received from the one or more payment providers on the electronic device. A payment method is selected for the purchase request based on the received one or more payment offers. The purchase request is completed using the selected payment method.

Another embodiment provides a system for mobile payment. In one embodiment, an electronic device uses a payment application. In one embodiment, digital payment methods are stored in secured storage. In one embodiment, the payment application receives payment offers from one or more payment providers for a purchase request. In one embodiment, a communication interface passes payment method information from the mobile application for digital payment method purchases based on a selected payment offer.

One or more embodiments may use a secure mobile payment ecosystem by using Trusted Computing Technology (TCG) and a cloud computing environment managed and trusted by financial institutions (e.g., credit card issuers). One embodiment provides for replacement of plastic credit cards by digital credit cards, such as digital certificates signed by the issuing banks. In one embodiment, a host of a mobile payment application (e.g., a mobile e-wallet application) and digital credit cards issued to a subscriber in the cloud computing environment is trusted by banks and other financial institutions. In one embodiment, the cloud computing environment supports a trusted entity that is trusted by all stakeholders (e.g., financial institutions). In one embodiment, trusted computing-based technologies are used to securely install, authenticate, and authorize a mobile e-wallet application in the mobile electronic device.

In one embodiment, the installation and management of a mobile payment application in the mobile electronic device takes place directly between the cloud computing environment (e.g., of financial institutions) without any involvement of a mobile network operator (MNO). In another embodiment, the mobile payment application is installed by the MNO, and the authentication and authorization of the mobile payment application occurs through a secure interface (e.g., application programming interfaces (APIs)) between the MNO and the cloud computing environment.

One or more embodiments provide for multiple payment providers (e.g., financial institutions, such as banks, credit companies, etc.) may present competing payment offers to a consumer at a time that the consumer is preparing to make a retail payment (e.g., for products/services) transaction using an electronic device (e.g., a mobile electronic device). In one embodiment, the payment providers already have relationships with the consumer, for example having issued a credit card or account to the consumer. In one embodiment, the information about the transaction is presented to the payment providers via a service or application (e.g., a Trusted Service Manager (TSM)).

In one embodiment, the payment providers determine payment offers in "real-time" based on information received about the transaction (e.g., product, cost, consumer information, location, retailer, etc.). In one embodiment, the payment providers provide offers of payment terms to the consumer, either directly to the electronic device, through the TSM, through a POS system, etc. In one or more embodiments, a software application running on the consumer's electronic device (e.g., a mobile wallet (MW) e-wallet, etc.), displays the competing offers to the consumer. In one embodiment, the consumer may review the competing offers and select a desired payment offer, and completes the payment transaction. In one embodiment, the payment offers from the payment providers may comprise payment terms and benefits, such as payment due date (e.g., for a benefit, for a full-payment, for a partial payment, etc.), interest rate charged (e.g., if not paid by the due date, for multiple payments, etc.), cash rebate (e.g., 2% of a transaction cost), loyalty points awarded to the consumer, other discounts for the same, similar or different goods/services, add-on item(s) discounts, coupons for the same, similar or different goods/services, etc.

FIG. 1 is a schematic view of a communications system in accordance with one embodiment. Communications system 10 may include a communications device that initiates an outgoing communications operation (transmitting device 12) and communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include several transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) that are operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., a 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, communications network 110 may support protocols used by wireless and cellular phones and personal e-mail devices (e.g., a Blackberry®). Such protocols may include, for example, GSM, GSM plus EDGE, CDMA, quadband, and other cellular protocols. In another example, a long range communications protocol may include Wi-Fi and protocols for placing or receiving calls using VOIP or LAN. Transmitting device 12 and receiving device 11, when located within communications network 110, may communicate over a bidirectional communication path such as path 13. Both transmitting device 12 and receiving device 11 may be capable of initiating a communications operation and receiving an initiated communications operation.

Transmitting device 12 and receiving device 11 may include any suitable device for sending and receiving communications operations. For example, transmitting device 12 and receiving device 11 may include a cellular telephone or a landline telephone, a personal e-mail or messaging device with audio and/or video capabilities, pocket-sized personal computers, personal digital assistants (PDAs), a desktop computer, a laptop computer, tablet computers, pad-type computing devices, a media player, wearable electronic devices or smart phones, and any other device capable of communicating wirelessly (with or without the aid of a wireless-enabling accessory system) or via wired pathways (e.g., using traditional telephone wires). The communications operations may include any suitable form of communication, including for example, voice communication (e.g., telephone calls), data communication (e.g., e-mails, text messages, media messages), near field communication (NFC), optical communication (e.g., optical character recognition (OCR), quick response codes (QR), etc.), or combinations of these (e.g., video conferences).

Figure 2:
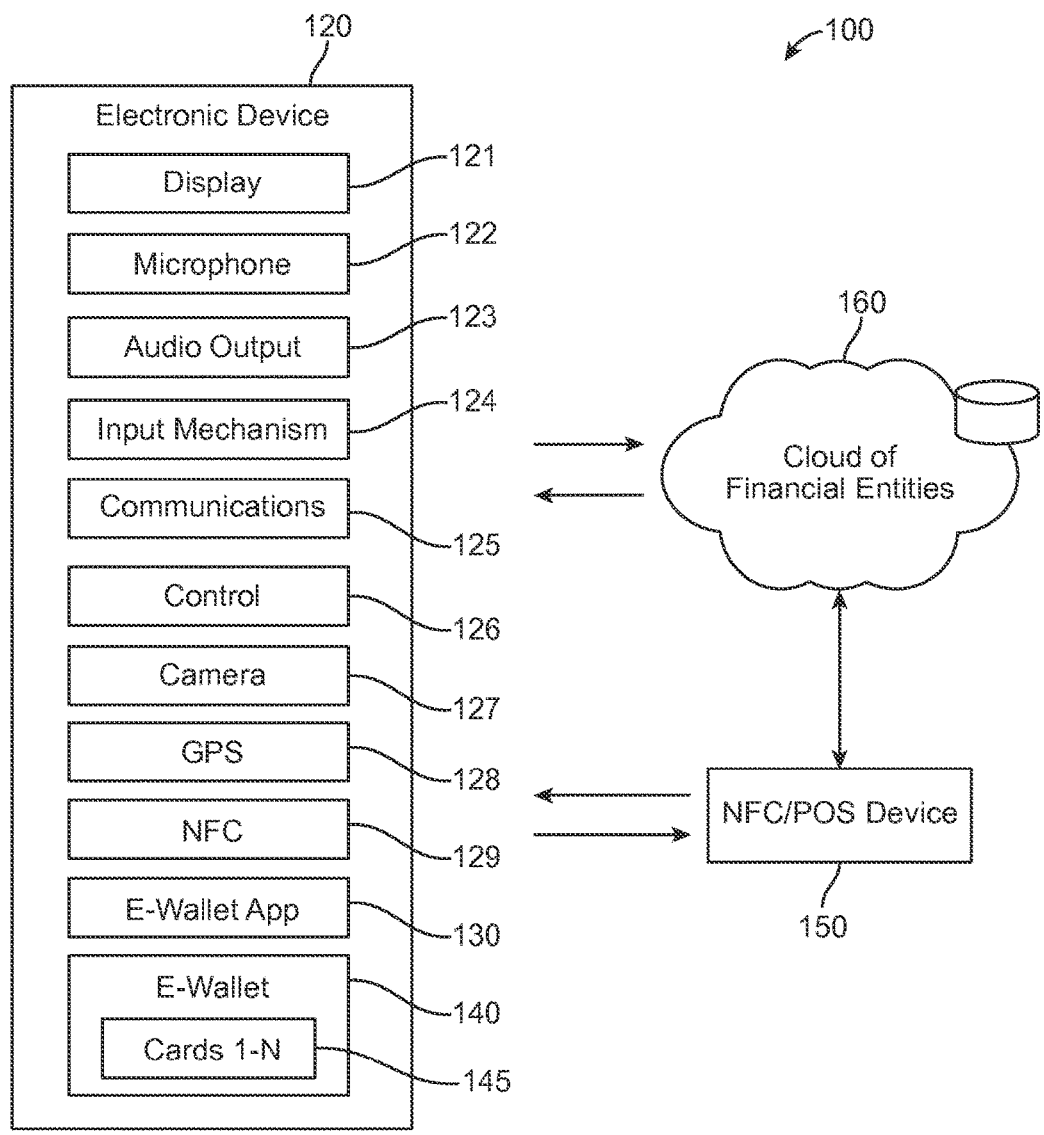
FIG. 2 shows a block diagram of an architecture of a system for competing mobile payment offers using an electronic device, according to an embodiment.

FIG. 2 shows a functional block diagram of an architecture for a system 100 that may be used for receiving competing payment offers for mobile payment using an electronic device 120, according to an embodiment. Both transmitting device 12 and receiving device 11 may include some or all of the features of electronics device 120. In one embodiment, the electronic device 120 may comprise a display 121, a microphone 122, an audio output 123, an input mechanism 124, communications circuitry 125, control circuitry 126, a camera 127, a global positioning system (GPS) receiver module 128, an NFC interface 129, and any other suitable components. In one embodiment, a mobile payment application 130 (e.g., an MW application, an e-wallet application, etc.) executes on the electronic device 120. In one embodiment, a MW/e-wallet table or list 140 stores multiple digital payment methods (e.g., credit cards 1-N 145) for a user's available payment methods (e.g., credit cards), where N is a positive integer equal to or greater than 2. In one embodiment, the electronic device 120 may communicate with the cloud computing environment 160 that comprises financial entities (e.g., banks, credit card issuers, etc.) that process credit cards and use thereof. In one embodiment, a TSM (e.g., TSM 620, FIG. 6) is used for managing communications between the electronic device and the financial entities, and may comprise an application running on the electronic device 120, an application executing in the cloud of financial entities 160, operating on a server, etc.

In one embodiment, the NFC interface 129 communicates with an NFC device 150 that may be coupled with or part of a POS system that accepts credit card payments for a merchant. In one embodiment, an MNO (not shown) may be responsible for installing the mobile application 130 and providing authorization for payment requests from the electronic device 120 by communicating with the private cloud computing environment 160. In other embodiments, the mobile application 130 may be installed directly by a consumer, by a financial entity, by the TSM 620, etc.

In one embodiment, all of the applications employed by an audio output 123, a display 121, an input mechanism 124, communications circuitry 125 and a microphone 122 may be interconnected and managed by control circuitry 126. In one embodiment, the audio output 123 may include any suitable audio component for providing audio to the user of the electronics device 120. For example, the audio output 123 may include one or more speakers (e.g., mono or stereo speakers) built into the electronics device 120. In some embodiments, the audio output 123 may include an audio component that is remotely coupled to electronics device 120. For example, the audio output 123 may include a headset, headphones or earbuds that may be coupled to communications device with a wire (e.g., coupled to the electronics device 120 with a jack) or wirelessly (e.g., Bluetooth® headphones or a Bluetooth® headset).

In one embodiment, the display 121 may include any suitable screen or projection system for providing a display visible to the user. For example, the display 121 may include a screen (e.g., an LCD screen) that is incorporated in electronics device 120. As another example, the display 121 may include a movable display or a projecting system for providing a display of content on a surface remote from the electronics device 120 (e.g., a video projector). The display 121 may be operative to display content (e.g., information regarding communications operations or information regarding available media selections) under the direction of control circuitry 126. In one embodiment, the display may provide optical communication (e.g., QR codes, etc.) readable by a POS device 150, or use an application to read QR codes, or provide OCR for a display on the POS device 150 for transactions, etc.

In one embodiment, the input mechanism 124 may be any suitable mechanism or user interface for providing user inputs or instructions to the electronics device 120. The input mechanism 124 may take a variety of forms, such as a button, keypad, dial, a click wheel, or a touch screen. The input mechanism 124 may include a multi-touch screen. The input mechanism 124 may include a user interface that may emulate a rotary phone or a multi-button keypad, which may be implemented on a touch screen or the combination of a click wheel or other user input device and a screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., a 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, flash memory, ROM, and/or RAM. In some embodiments, the memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an ASR application, a dialog application, a map application, a media application (e.g., QuickTime®, MobileMusic.app, or MobileVideo.app). In some embodiments, the electronics device 120 may include one or several applications operative to perform communications operations. For example, the electronics device 120 may include a messaging application, a mail application, a telephone application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include the microphone 122 to allow the user to transmit audio (e.g., voice audio) during a communications operation or as a means of establishing a communications operation or as an alternate to using a physical user interface. The microphone 122 may be incorporated in electronics device 120, or may be remotely coupled to the electronics device 120. For example, the microphone 122 may be incorporated in wired headphones, or the microphone 122 may be incorporated in a wireless headset.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

In one embodiment, a user may direct the electronics device 120 to perform a communications operation using any suitable approach. As one example, a user may receive a communications request from another device (e.g., an incoming telephone call, an e-mail or text message, an instant message) and may initiate a communications operation by accepting the communications request. As another example, the user may initiate a communications operation by identifying another communications device and transmitting a request to initiate a communications operation (e.g., dialing a telephone number, sending an e-mail, typing a text message, or selecting a chat screen name and sending a chat request).

In one embodiment, the electronic device 120 may comprise a mobile device that may utilize mobile device hardware functionality including: the display 121, the GPS receiver module 128, the camera 131, a compass module, and an accelerometer and gyroscope module. The GPS receiver module 128 may be used to identify a current location of the mobile device (i.e., user), a store, a shopping area (e.g., mall, fair, event, market, etc.). The compass module is used to identify direction of the mobile device. The accelerometer and gyroscope module is used to identify tilt of the mobile device. In other embodiments, the electronic device may comprise a television or television component system.

Figure 3:
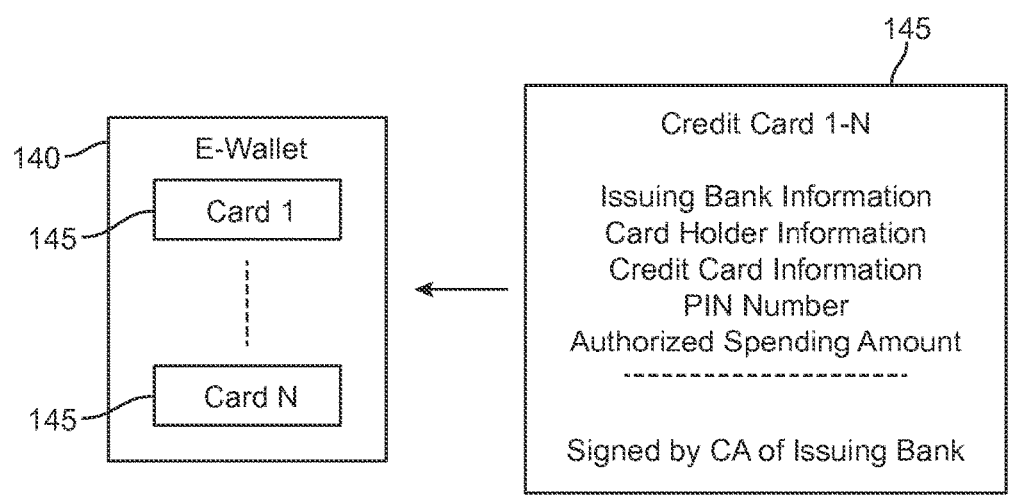
FIG. 3 shows an example embodiment e-wallet including digital credit card architecture for mobile payment using an electronic device, according to an embodiment.

FIG. 3 shows an example MW/e-wallet table or list 140 that stores a list of digital credit cards 1-N 145 for a user's available credit cards for mobile payment using the electronic device 120, according to an embodiment. In one embodiment, digital credit cards 1-N 145 act as a replacement of plastic credit cards, and may comprise digital certificates signed by the issuing banks or financial institution, or CA of the issuing banks or financial institution. In one embodiment, the digital credit cards 1-N 145 comprise all of the information that is encoded by the banks or credit card issuers in the magnetic strip of an equivalent plastic credit card, such as issuing bank name, cardholder name, credit card number, expiration date, user personal identification number (PIN), authorized spending amount, random characters (e.g., bank-specific for challenge), policy (e.g., allowed storage time), digital signature, etc. In one or more embodiments, the digital credit cards 1-N 145 may include a uniform resource locator (URL) of the issuing bank (e.g., for communication via the mobile payment application (e.g., a mobile e-wallet application) to the issuing bank(s)).

In one embodiment, the digital credit cards 1-N 145 may include an additional bank-specific policy element. In one example, the policy may specify whether the digital credit card 1-N 145 may be stored on the electronic device 120 for a certain time period. In one example, a particular bank may allow the storage of the digital credit card 1-N 145 on the electronic device 120 for 24 hours after the download. In this example, after 24 hours, the mobile application 130 automatically deletes the signed certificate or authorization for the digital credit card 1-N 145.

Figure 4:
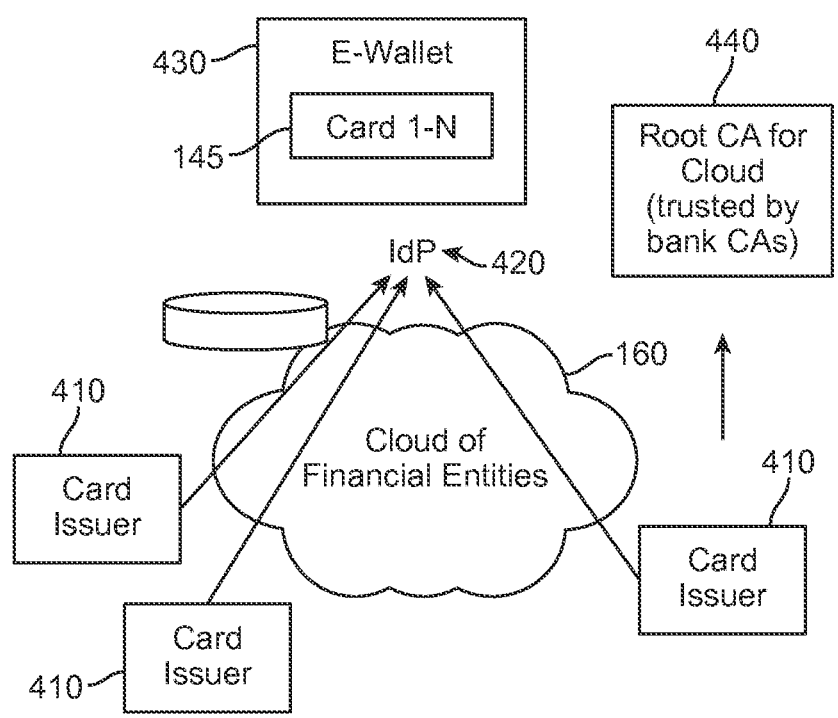
FIG. 4 shows an example embodiment of a cloud computing environment for mobile payment using an electronic device, according to an embodiment.

FIG. 4 shows an architecture for a cloud computing environment 160 for mobile payment using an electronic device 120, according to an embodiment. In one embodiment, the hosting of the mobile application 130 and storage of an MW/e-wallet module 430 and digital credit cards 1-N 145 (issued as digital certificates) are provided in the cloud computing environment 160, where credit card issuers 410 (e.g., financial institutions) provide the processing for their respective issued digital credit cards 1-N 145. In one embodiment, the cloud computing environment is private and only hosted by a number of banks and financial institutions (e.g., credit card issuers 410).

In one embodiment, the cloud computing environment 160 hosts mobile financial applications for their respective customers. In one embodiment, the cloud computing environment 160 may also host a root credit authority (CA) 440 that signs digital credit cards 1-N 145 when a payment/purchase request for a particular credit card from the user is made. In one embodiment, the private cloud computing environment 160 may provide an identity provider 420 (IdP) to authenticate a holder of a credit card. In one embodiment, the user of a digital credit card 1-N 145 may be identified by a digital identity, such as a financial user identification (financialUserID), etc.

Figure 5:
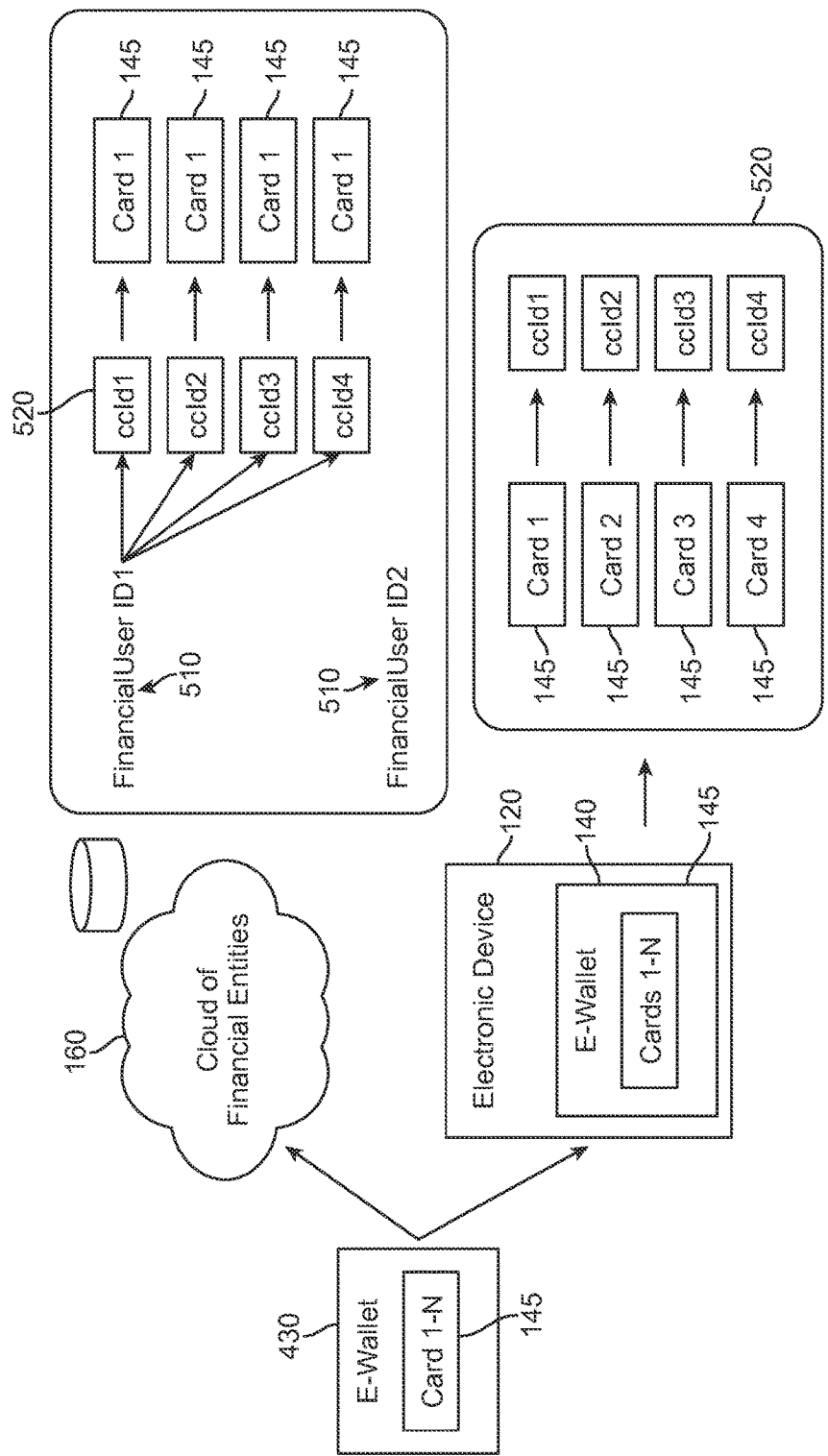
FIG. 5 shows another example embodiment of a cloud computing environment for mobile payment using an electronic device, according to an embodiment.

FIG. 5 shows an example architecture for the cloud computing environment 160 and the electronic device 120, according to an embodiment. In one embodiment, the mobile MW/e-wallet table or list 140 may be installed in the electronic device 120 either from a server hosted by an MNO, the cloud computing environment 160, a financial institution, etc. In one embodiment, the mobile application 130 on the electronic device 120 is developed and deployed by device manufacturers, such as Samsung®. In other embodiments, all the stakeholders (involved in the payment processing) may jointly develop requirements and standard protocols.

In one embodiment, device manufacturers may develop mobile wallet technologies based on the specifics of their devices (e.g., using a mobile trusted module (MTM)/trusted platform module (TPM), Trustzone or any other relevant technology). In one embodiment, financial institutions may develop their own technologies on the cloud side that may function properly in a mobile wallet ecosystem by following standards.

Figure 6:
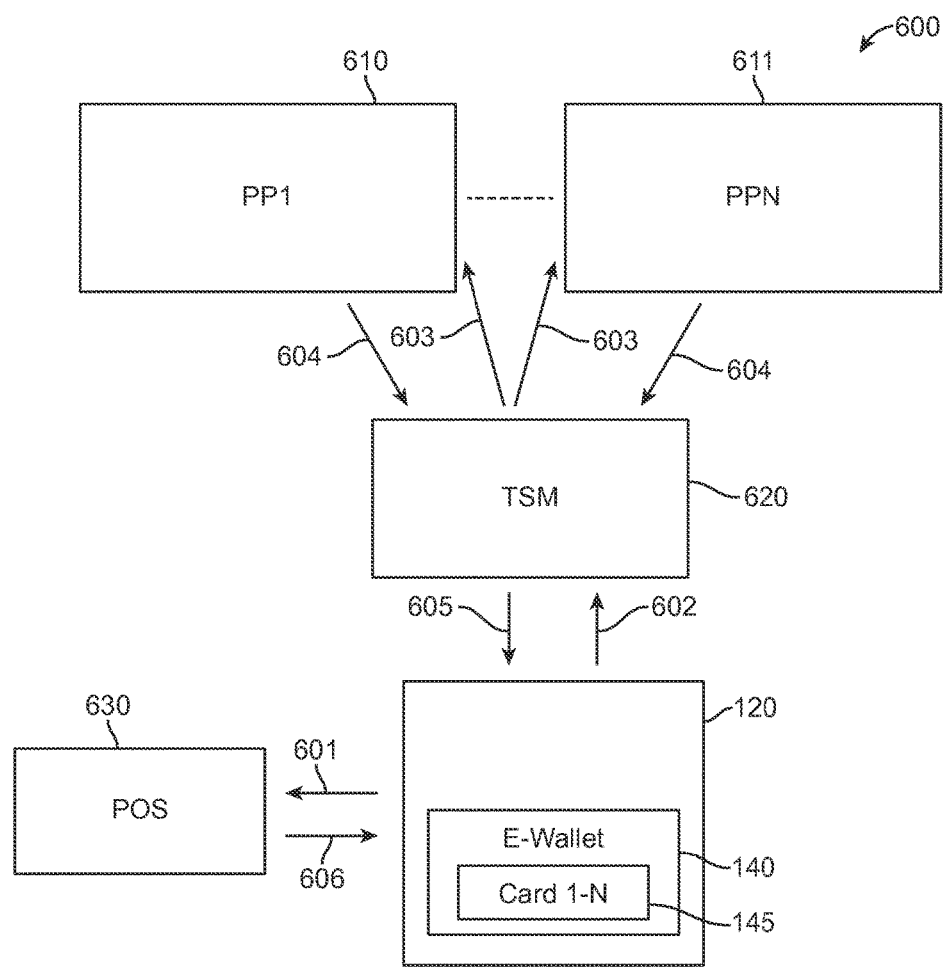
FIG. 6 shows a block diagram for competing mobile payment offers using an electronic device, according to an embodiment.

In one embodiment, the mobile application 130 in the electronic device 120 has a counterpart in the cloud computing environment 160 of financial institutions. In one embodiment, the mobile application 130 in the electronic device 120 maintains the MW/e-wallet table or list 140 of the credit cards owned by the user. In one embodiment, each credit card may be identified by a credit card identifier 1-N (ccID 1-N) 520, where N is a positive integer greater or equal to 2. In one embodiment, the ccID 1-N 520 may comprise a code or a hash of the digital credit card 1-N 145 (e.g., digital certificate). In one embodiment, when the ccIDs 1-N 520 are stored on the electronic device instead of the actual credit card information, the actual credit card information (e.g., digital certificate) is stored in the cloud computing environment 160 of financial institutions, in the TSM 620 (FIG. 6, etc.).

In one embodiment, an MW application in the cloud computing environment maintains a table or list of the digital credit cards 1-N 145 owned by every user identified by a financialUserID 510. In this embodiment, the main difference is that the table or list of digital credit cards 1-N 145 may also contain the actual digital certificate owned by the user (e.g., not a hash).

In one embodiment, Trusted Computing (TC) based technologies may be used to authenticate and authorize the mobile application 130 in the electronic device 120. In one implementation, financial institutions may desire delivering digital credit cards 1-N 145 to a mobile device running an authorized MW application. In one example, the digital credit card 1-N 145 may only be used on an authorized mobile device (e.g., electronic device 120). In one embodiment, TC-based technology (e.g., presence of trusted platform module (TPM)/mobile trusted module (MTM) chip in the electronic device 120) for remote software attestation of the mobile application 130 running in the electronic device 120 may be used by a financial institution server in the cloud computing environment 160.

In one embodiment, mobile users are reliably identified by financial institutions and/or MNOs. In one embodiment, financial institutions and/or MNOs may assign identities to users. In one example, a mobile user may have two types of identities: (1) financialUserID 510: a server in the financial institution cloud environment 160 identifies the credit card owner through this identification (ID); and (2) mobileUserID: where an MNO may identify the mobile user through this ID. In this embodiment, identification relies on the assigned ID values and a user may use the same ID value on multiple electronic devices.

In one embodiment, identities are tied to specific hardware devices (e.g., electronic device 120). In one embodiment, if an electronic device 120 employs TPM/MTM or a similar hardware chip, financial institutions may use the characteristics of the chip for identification and authentication purposes. In one embodiment, each TPM/MTM chip has unique keys that are used while performing trusted computing functions, such as remote attestation. In one embodiment, financial institutions may request the electronic device 120 to perform a remote attestation before authorizing any payment/purchase or transaction request. In this embodiment, the financial institutions may authenticate the electronic device 120 and ensure that the electronic device 120 is running a legitimate version of the mobile application 130 and the software stack below the mobile application 130. In this embodiment, the financial institutions may trust the purchase/transaction requests initiated by that electronic device 120.

In one embodiment, MNOs may use already existing subscriber identity module (SIM) cards and international mobile equipment identity (IMEI) for identification and authorization purposes. In this embodiment, the MNOs may leverage the same mechanisms they use when they get a phone call or short message service (SMS) request from a particular mobile device (e.g., electronic device 120).

FIG. 6 shows a block diagram of a system 600 for competing mobile payment offers using an electronic device, according to an embodiment. In one embodiment, the system 600 comprises the electronic device 120 including the MW application 140, a TSM 620, a POS system 630 and multiple payment providers PP1 610 to PPN 611, where N is a positive integer greater or equal to 2. In one embodiment, the arrows shown with the system 600 may represent data flow/operations for an example embodiment.

In one embodiment, the TSM 620 provides a service to the MW application 140, and may also have trusted relationships with payment providers. In one embodiment, the TSM 620 may present transaction information to the payment providers PP1 610 to PPN 611 without user identification. In one embodiment, the TSM 620 may be installed in the mobile device 120, executing in the financial institution cloud environment 160, on a server, etc.

In one embodiment, assume that a consumer has the electronic device 120 connected to a wireless communication medium, such as the Internet. In one example embodiment, assume that the consumer is running the MW application 140 on the electronic device 120, and has previously entered information about more than one of their existing payment providers (such as a credit card accounts, bank accounts, payment service companies, etc.); the consumer also has entered information about various loyalty programs, such as retailer-specific accounts, airline frequent flier accounts, hotel loyalty programs, etc. In one embodiment, the MW application 140 is running and is connected (securely) to the TSM 620, which is also connected (securely) to various payment providers (e.g., PP1 610 to PPN 611).

In one embodiment, after the consumer selects desired goods or services, the POS 630 (e.g., retailer system, reader, etc.) presents the payment requested (e.g., bill, payment required) at arrow 601 to the electronic device 120. In one embodiment, the retailer may be a physical store, an on-line store, etc. that sells goods or services and receives payment.

In one embodiment, the payment requested data information may be communicated over a local wireless network, through the Internet, optically (e.g., via QR or OCR), etc. In one embodiment, the payment requested data information may comprises purchase amount, type of currency requested, list of payment options/methods accepted (e.g., a retailer may only accept specific types of credit cards, but not all major credit cards, etc.).

In one embodiment, the MW application communicates the transaction description data to the TSM 620 at arrow 602. In one embodiment, the transaction description data may comprise one or more of the following: the amount of the payment requested and currency type, retailer identification, list of payment networks accepted by the retailer, consumer identification (which may be implicit as the TSM 620 may already know the identity of the electronic device 120 and the consumer due to credentials installed on the electronic device 120 at the time that the MW application 140 was installed), status of the consumer account (e.g., registered/activated), location information, etc. In one embodiment, the user of the electronic device 120 may be asked to identify their self (e.g., by entering a username and password, PIN, thumbprint, etc.) at a previous interaction between the user, the MW application 140, and the TSM 620.

In one embodiment, the TSM 620 communicates the transaction description data to the payment providers PP1

610 to PPN 611 at arrow 603. In one embodiment, the payment providers PP1 610 to PPN 611 comprise payment providers that that have been activated within the MW application 140 by the consumer, and provide payments in a form accepted by the retailer. In one embodiment, the transaction description data provided to the payment providers PP1 610 to PPN 611 from the TSM 620 may comprise one or more of the following: the amount of the payment requested and currency type, retailer identification, consumer's identification and account identification (it should be noted that an established relationship between the consumer and the payment provider exists, thus there is no privacy issue in sharing the consumer's identity with the payment providers), consumer's loyalty accounts (active within the MW application 140 and known to the TSM 620), etc.

In one embodiment, each payment provider PP1 610 to PPN 611 may use a proprietary decision-making process or application to determine the payment terms to offer to the consumer for this particular payment request transaction. In one embodiment, in addition to the transaction description data that the payment providers PP1 610 to PPN 611 received from the TSM 620, the payment providers PP1 610 to PPN 611 may also use information already known about the consumer, such as outstanding balance, frequency of transactions, billing cycle dates, etc.

In one embodiment, the payment providers PP1 610 to PPN 611 send a payment offer to the TSM 620 at arrow 604. In one embodiment, the payment offer communicated may comprise one or more of the following: payment due date (e.g., when the consumer is expected to pay the payment provider in full, minimum payment due date, etc.), cash rebate amount (if any; e.g., 1.5% of transaction, etc.), loyalty points awards (e.g., 100 miles, 500 hotel points, etc.), interest rate charged if payment not made by due date (e.g., annual interest rate of 13% on balance outstanding after 30 days, etc.). In one embodiment, additional incentives may also be included in the payment offer, such as an incentive for purchasing a specific product (e.g., a partnership exists with certain products and the payment provider; an agreement with the retailer, etc.), discounts for the same, similar or different services or goods at the same or another location, coupons for the same, similar or different services or goods, etc.).

In one embodiment, the payment offers from the payment providers PP1 610 to PPN 611 are received and aggregated by the TSM 620, and then communicated from the TSM 620 to the MW application 140 on the electronic device 120 at arrow 605. In one embodiment, the MW application 140 displays the payment offers on the electronic device 120 to the consumer, in a display (e.g., display 121) and a user interface (e.g., a graphical user interface (GUI) specific to the MW application 140. In one example embodiment, the GUI may show a list or slidable views, such as: PP1 610: 1% cash back, 100 airline carrier A miles, due June 30 of the current year; PP2 611: 1.5% cash back, due July 10 of this year; PP3 611: 100 airline carrier B miles, 300 Hotel A Honors points, due July 2 of the current year, etc.

In one embodiment, the consumer selects one of the payment offers and completes the transaction using the MW application 140 and communicates the payment information at arrow 606. In one embodiment, the TSM 620 and/or a local transaction process using local POS connection, such as NFC may be used. In one embodiment, the payment transaction may be conducted via Internet services (i.e., without local direct connection between the electronic device 120 and the retail POS 630). In one embodiment, subsequent "rounds" of the negotiation between consumer using the MW application 140 of the electronic device 120 and the payment providers PP1 610 to PPN 611.

In one embodiment, the consumer may respond to one or more of the payment providers PP1 610 to PPN 611 with a counter-offer using the MW application 140, such as a new proposed offer to one or more of the payment providers PP1 610 to PPN 611 in response to the payment offers received from the payment providers PP1 610 to PPN 611. In one embodiment, the MW application 140 or the TSM 620 may provide information to each payment provider to make the payment providers PP1 610 to PPN 611 aware of the payment offers from the competing payment providers, and giving them a chance to improve/modify their offers to the consumer.

In one embodiment, a payment offer auction between the payment providers PP1 610 to PPN 611 and the user of the MW application 140 may be provided. In one example embodiment, the auction may comprise the user of the MW application 140 supplying proposed payment terms and the payment providers PP1 610 to PPN 611 may compete to meet, beat or get the closest the proposed payment terms. In another embodiment, the MW application 140 determines the best payment offer and displays the determined payment offer to the user of the electronic device 120.

In one embodiment, the MW application 140 may use location information (e.g., from the GPS 128) and communicate with the TSM 620 or local retailers and forward a request to the payment providers PP1 610 to PPN 611 for payment offers based on an agreement with the local retailers or product representatives. The payment providers PP1 610 to PPN 611 may then forward incentives and payment offers regarding the local retailers and local products that may be offered in the location of the electronic device 120. In other embodiments, combinations of different scenarios mentioned herein may be provided using one or more embodiments.

Figure 7:
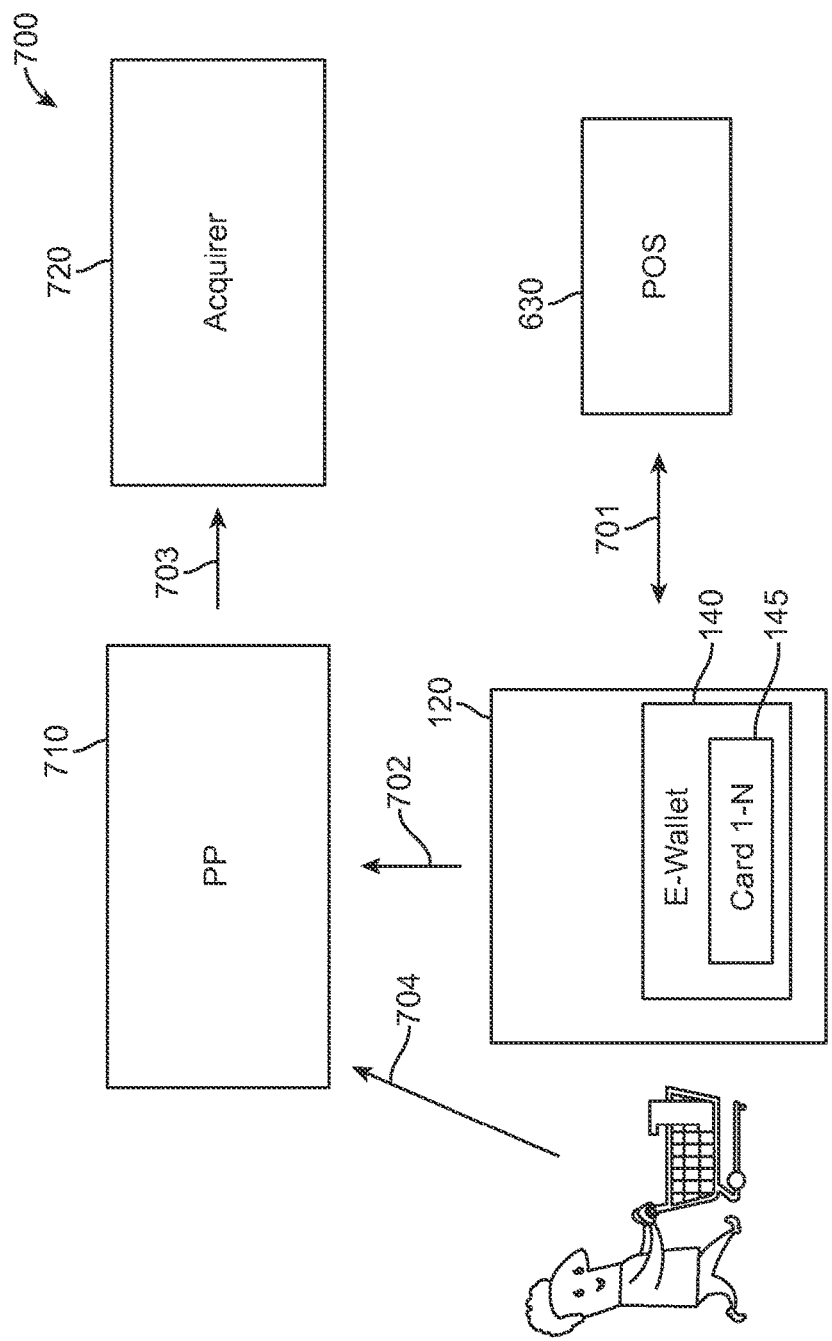
FIG. 7 shows a block diagram for mobile payment using an electronic device, according to an embodiment.

FIG. 7 shows a block diagram of a flow 700 for mobile payment using an electronic device 120, according to an embodiment. It should be mentioned that although there are many possible ways to complete a purchase transaction using the MW application 140, an example embodiment flow 700 is shown. In one embodiment, at arrow 701 transaction information is communicated from a retailer POS 630 to the MW application 140 on the electronic device 120 (e.g., QR code, NFC communication, etc.). In one embodiment, the consumer communicates at arrow 702 with the selected payment provider PP 710 and authorizes the selected payment provider PP 710 to process the transaction.

In one embodiment, the selected payment provider PP 710 issues the payment to the retailer's financial institution, Acquirer 720, at arrow 703. In one embodiment, the issuance of payment may be made through a payment network, such as VISA®. In one embodiment, the transaction settlement is then made. In one embodiment, at a later date, the consumer pays the selected payment provider PP 710 (e.g., writing a check to the bank after receiving a credit card bill containing the transaction, using bank information to pay electronically, using a bill payment service, etc.) at arrow 704. In one embodiment, the selected payment provider PP 710 credits the consumer with the promised amounts of cash rebates, loyalty points, or other terms of the payment offer that was selected.

Figure 8:
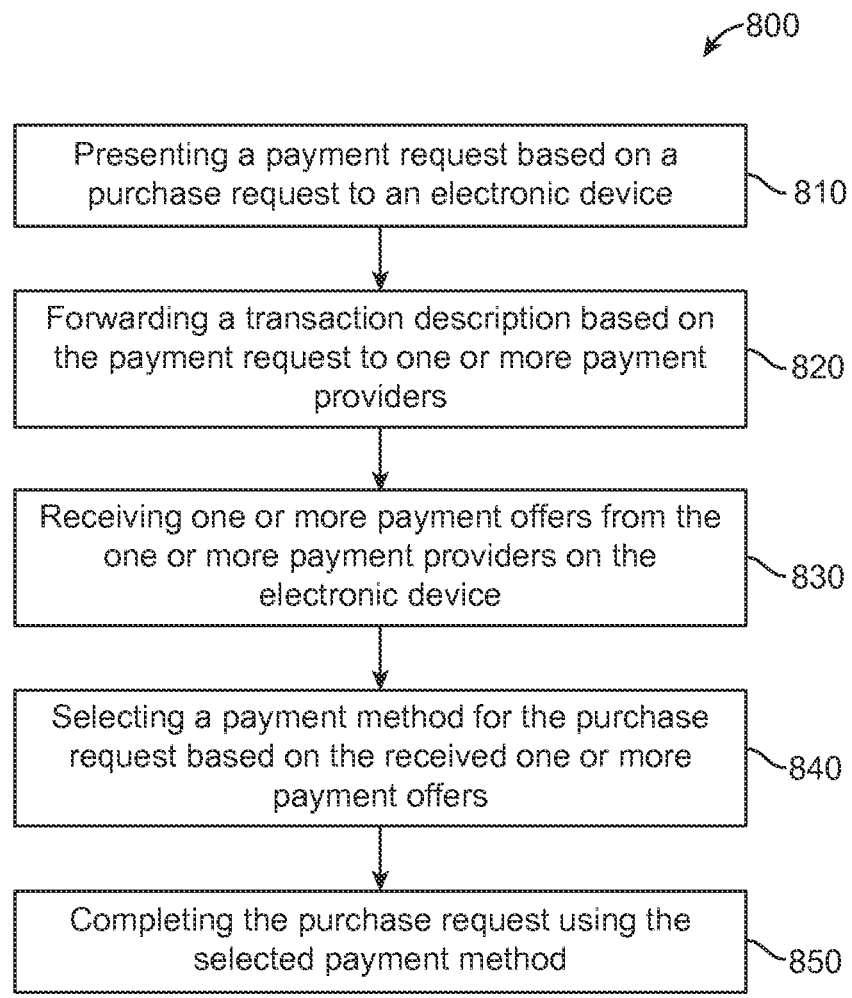
FIG. 8 shows a flow diagram for competing mobile payment offers using an electronic device, according to an embodiment.

FIG. 8 shows a flow diagram 800 for competing mobile payment offers using an electronic device (e.g., electronic device 120), according to an embodiment. In one embodiment, in block 810 a payment request based on a purchase request by a consumer to a retailer or servicer (e.g., POS 630) is presented to an electronic device. In one embodiment, in block 820 a transaction description based on the payment request is forwarded to one or more payment providers (e.g., payment providers PP1 610 to PPN 611).

In one embodiment, in block 830 one or more payment offers are received on the electronic device from the one or more payment providers. In one embodiment, in block 840 a payment method is selected (e.g., a particular credit card, a payment company, a payment service, etc.) by a consumer using an MW application (e.g., MW application 140) for the purchase request based on the received one or more payment offers. In one embodiment, in block 850 the purchase request is completed using the selected payment method.

In one embodiment, the MW application is launched on an electronic device at a merchant POS machine/system, where a user selects a particular credit card (e.g., digital credit card 1-N 145) from a table or list of available credit cards (e.g., an e-wallet table or list) to use for a purchase/payment. In one embodiment, the user launches the MW application manually by, for example, tapping on a touch screen (e.g., display 121). In one embodiment, the mobile application passes the selected digital credit card to the merchant from an interface to a reader (e.g., NFC, optical, etc.). In one embodiment, in the payment/purchase transaction request is sent to the financial server of the cloud to get an authorization for the transaction.

Figure 9:
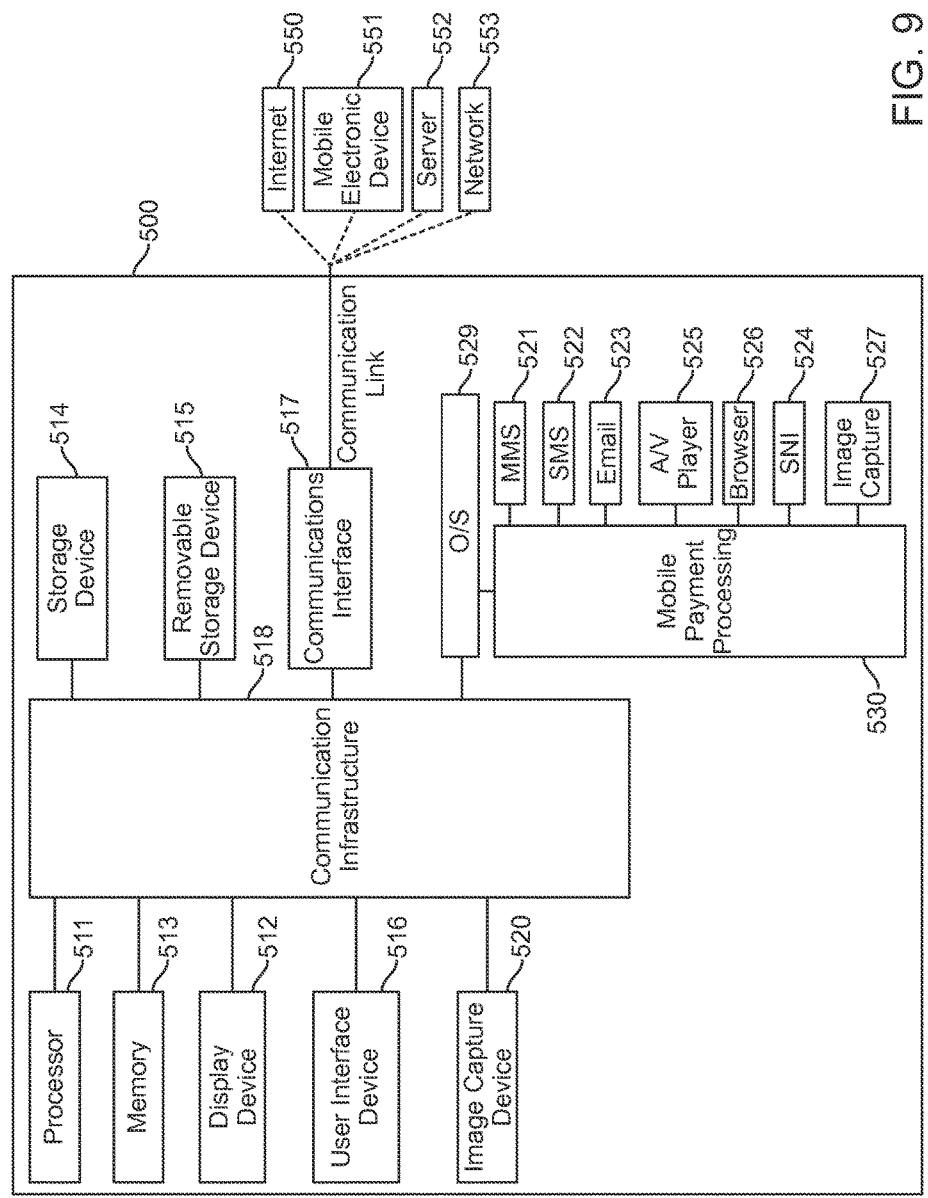
FIG. 9 is a high-level block diagram showing an information processing system comprising a computing system implementing an embodiment.

FIG. 9 is a high-level block diagram showing an information processing system comprising a computing system 500 implementing one or more embodiments. The system 500 includes one or more processors 511 (e.g., ASIC, CPU, etc.), and can further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as WiFi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device, such as a camera (e.g., camera 127, FIG. 2). The system 500 may further include application modules as MMS module 521, SMS module 522, e-mail module 523, social network interface (SNI) module 524, audio/video (AV) player 525, web browser 526, image capture module 527, etc.

The system 500 further includes a mobile payment processing module 530 as described herein, according to an embodiment. In one embodiment, the mobile payment processing module 530 may include processing for competing payment offers from payment providers to a MW application 140. In one implementation the mobile payment processing module 530 along with an operating system 529 may be implemented as executable code residing in a memory of the system 500. In another embodiment, such modules are in firmware, etc.

One or more embodiments provide a consumer with the ability to choose a payment provider at time of mobile payment based on an aggregation and presentation of all relevant payment terms from all available payment providers. In one or more embodiments, consumers may receive better payment terms due based on multiple payment providers making competing offers for the consumer's business at the time of payment.

In one or more embodiments, the payment provider is provided with an ability to tailor offered payment terms on a per-consumer, per-retailer, and per-transaction basis. In one or more embodiments, the payment provider has the ability to "win" business from consumers by potentially offering better payment terms than competing payment providers.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

Embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of one or more embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for mobile payment offer competition, comprising:
   receiving, by an electronic device, an electronic payment request for a mobile payment transaction based on an electronic purchase request, the electronic device comprising a mobile electronic device including processing hardware for authenticating the electronic device using at least one associated unique key and characteristics of the processing hardware, and secured storage including a plurality of digital payment methods each including encoded information;
   performing, by the electronic device, remote attestation for a mobile payment process executing in the electronic device for payment providers using the processing hardware, wherein the payment providers form a private cloud computing environment;
   forwarding a communication including a transaction description based on the electronic payment request to the payment providers;
   receiving a communication including payment offers from the payment providers on the electronic device, wherein the electronic device enables the payment providers to each make real-time offers that are received by the electronic device on a per-transaction basis using electronic communications; and
   completing the electronic purchase request to complete the mobile payment transaction by communicating a selected digital payment method to a particular payment provider of the payment providers.

2. The method of claim 1, wherein receiving the electronic payment request comprises receiving payment request data via one or more of: a local wireless network, the Internet, near field communication (NFC), or optical communication, and each digital payment method includes a policy element specifying a storage time limit after download for a signed certificate or authorization for each digital payment method of the plurality of digital payment methods to remain on the electronic device.

3. The method of claim 2, wherein the payment request data comprises at least one of: a required payment amount, type of currency requested, or payment methods accepted, and installation and management of the mobile payment process on the mobile electronic device takes place directly with the private cloud computing environment.

4. The method of claim 3, wherein the transaction description comprises at least one of: the required payment amount, the type of currency requested, retailer identification, purchaser identification, or location information.

5. The method of claim 4, wherein an application executing on the electronic device forwards the transaction description directly to the payment providers, or through a trusted service manager (TSM) that forwards the transaction description to the payment providers.

6. The method of claim 5, wherein the payment offers are communicated to at least one of: the electronic device for presentation for selection, or the TSM for aggregation and communication to the electronic device.

7. The method of claim 5, wherein:
   the TSM is one of: installed on the electronic device, accessed from a cloud computing environment, or accessed from a server; and
   the electronic device comprises a mobile phone, a mobile computing device, a mobile wearable device or a point of service (POS) device.

8. The method of claim 1, wherein the payment providers are determined based on the plurality of digital payment methods included in a mobile wallet accessed by the electronic device, and the processing hardware comprises trusted platform module (TPM) processing hardware.

9. The method of claim 1, further comprising:
   communicating, by the electronic device, a communication including a counter offer based on the received payment offers to at least one of the payment providers; and
   receiving a selection, by the electronic device, of a digital payment method from the plurality of digital payment methods for the electronic purchase request based on the received payment offers or another offer based on the counter offer;
   wherein the received one or more payment offers are based on at least one of: payment method information, consumer information, merchant information, or information for the purchase request.

10. The method of claim 1, further comprising:
    identifying a current location using a global positioning system (GPS) receiver of the electronic device,
    wherein the transaction description includes the current location, the electronic device communicates proposed payment terms to the payment providers and receives the payment offers based on an auction between the payment providers, and the electronic device further enables the payment providers to each make real-time offers on a per location basis.

11. The method of claim 1, further comprising:
    comparing, by an application executing on the electronic device, payment request data for the payment offers; and selecting, by the application, the payment method from the plurality of digital payment methods based on a result of the comparing.

12. The method of claim 1, wherein:
the payment providers determine offers dynamically based on information received about the electronic purchase request; and
the payment offers comprise one or more of payment terms, interest rate, or benefits comprising one or more of a rebate, loyalty points, a discount, or a coupon.

13. A system for mobile payment, comprising:
an electronic device configured to execute a payment application, wherein digital payment methods are stored in secured storage, the payment application is configured to receive payment offers from payment providers for a purchase request for a mobile payment transaction, the electronic device comprises processing hardware for authenticating the electronic device using at least one key and characteristics of the processing hardware, remote attestation for the payment application executing in the electronic device is performed by the electronic device using the processing hardware, and the payment providers form a private cloud environment; and
a communication interface configured to pass digital payment method information from the payment application for digital payment method purchases to complete the mobile payment transaction based on a received selection for a payment offer, wherein the electronic device enables the payment providers to each make real-time offers that are received by the electronic device on a per-transaction basis using electronic communications.

14. The system of claim 13, wherein each digital payment method includes a policy element specifying a storage time limit after download for a signed certificate or authorization for each digital payment method to remain on the electronic device.

15. The system of claim 13, wherein the processing hardware comprises trusted platform module (TPM) processing hardware.

16. The system of claim 13, wherein identification of a current location is performed by the electronic device using a global positioning system (GPS) receiver of the electronic device.

17. The system of claim 13, wherein the digital payment methods comprise digital credit cards, the communication interface is configured to pass digital credit card information to a reader for a point-of-service (POS) system to request payment using a digital credit card from a list of stored digital credit cards in the secured storage, and each digital payment method includes encoded information and a policy element specifying a storage time limit after download for a signed certificate or authorization for each digital payment method to remain on the electronic device.

18. The system of claim 17, wherein:
the electronic device is configured to:
identify a current location using a global positioning system (GPS) receiver of the electronic device; and
receive payment request data from the POS system and to communicate a transaction description to the payment providers;
installation and management of the payment application on the electronic device takes place directly with the private cloud computing environment;
the transaction description includes the current location; and
the electronic device further enables the payment providers to each make real-time offers on a per location basis.

19. The system of claim 18, wherein the payment request data comprises at least one of: a required payment amount, type of currency requested, or digital payment methods accepted, and the transaction description comprises at least one of: the required payment amount, the type of currency requested, retailer identification, purchaser identification, or location information.

20. The system of claim 19, wherein:
the payment application is configured to forward the transaction description:
directly to the payment providers, or through a trusted service manager (TSM) application that forwards the transaction description to the payment providers; and
the payment application is configured to determine the payment providers based on the digital payment methods included in a mobile wallet accessible by the electronic device.

21. The system of claim 20, wherein the payment offers are based on at least one of: digital payment method information, consumer information, merchant information, or information for the purchase request, and the payment offers are communicated to: the electronic device for selection, and the TSM application for aggregation and communication to the electronic device.

22. The system of claim 13, wherein:
the processing hardware comprises trusted platform module (TPM) processing hardware;
the payment application is configured to provide a counter offer to at least one payment provider based on the payment offers;
the received selection for the payment offer is selected from the payment offers or another received offer based on the counter offer and the received selection is communicated to a particular payment provider of the payment providers;
the communication interface is configured to communicate proposed payment terms to the payment providers; and
the payment application is configured to receive the payment offers based on an auction between the payment providers.

23. The system of claim 22, wherein the payment application is configured to compare payment request data for the payment offers, and to select the digital payment method based on a result of the compare.

24. A non-transitory processor-readable medium that includes a program that when executed by a processor performs a method comprising:
receiving, by an electronic device, an electronic payment request for a mobile payment transaction based on an electronic purchase request, the electronic device comprising a mobile device including processing hardware for authenticating the electronic device using at least one associated unique key and characteristics of the processing hardware, and secured storage including a plurality of digital payment methods each including encoded information;
performing, by the electronic device, remote attestation for a mobile payment process executing in the electronic device for payment providers by the processing hardware, wherein the payment providers form a private cloud computing environment;
forwarding a communication including a transaction description based on the electronic payment request to the payment providers;

receiving a communication including payment offers from the payment providers on the electronic device, wherein the electronic device enables the payment providers to make a real-time offer that are received by the electronic device on a per-transaction basis using electronic communications; and completing the electronic purchase request to complete the mobile payment transaction by communicating a selected digital payment method to a particular payment provider of the payment providers.

25. The non-transitory processor-readable medium of claim 24, wherein receiving the electronic payment request comprises receiving payment request data via at least one of: a local wireless network, over the Internet, via near field communication (NFC), or optically, and each digital payment method includes a policy element specifying a storage time limit after download for a signed certificate or authorization for each digital payment method of the plurality of digital payment methods to remain on the electronic device.

26. The non-transitory processor-readable medium of claim 25, wherein the payment request data comprises at least one of: a required payment amount, type of currency requested, or payment methods accepted, the transaction description comprises at least one of: the required payment amount, the type of currency requested, retailer identification, purchaser identification, or location information, and installation and management of the mobile payment process on the electronic device takes place directly with the private cloud computing environment.

27. The non-transitory processor-readable medium of claim 26, wherein:
the method further comprising identifying a current location using a global positioning system (GPS) receiver of the electronic device;
the transaction description includes the current location;
the electronic device further enables the payment providers to each make real-time offers on a per location basis;
an application executing on the electronic device forwards the transaction description: directly to the one or more payment providers, or through a trusted service manager (TSM) that forwards the transaction description to the payment providers; and
the payment providers are determined by the application based on the plurality of digital payment methods included in a mobile wallet accessible by the electronic device.

28. The non-transitory processor-readable medium of claim 27, wherein the received payment offers are based on at least one of: payment method information, consumer information, merchant information, or information for the electronic purchase request.

29. The non-transitory processor-readable medium of claim 28, wherein the payment offers are communicated to at least one of: the electronic device for presentation for selection, or the TSM for aggregation and communication to the electronic device.

30. The non-transitory processor-readable medium of claim 27, wherein:
the TSM is at least one of: installed on the electronic device, accessed from a cloud computing environment, or accessed from a server and the electronic device comprises a mobile phone, a mobile computing device, a mobile wearable device or a point of service (POS) device.

31. The non-transitory processor-readable medium of claim 24, the method further comprising:
communicating, by the electronic device, a communication including a counter offer based on the received payment offers to at least one of the payment providers; and
receiving a selection, by the electronic device, of a digital payment method from the plurality of digital payment methods for the electronic purchase request based on the received payment offers or another offer based on the counter offer;
wherein the electronic device communicates proposed payment terms to the payment providers and receives the payment offers based on an auction between the payment providers.

32. The non-transitory processor-readable medium of claim 24, the method further comprising:
comparing, by an application executing on the electronic device, payment request data for the payment offers; and
selecting, by the application, the digital payment method from the plurality of digital payment methods based on a result of the comparing.

33. The non-transitory processor-readable medium of claim 24, wherein:
the payment providers determine offers dynamically based on information received about the electronic purchase request; and
the payment offers comprise at least one of payment terms, interest rate, or benefits comprising one or more of a rebate, loyalty points, a discount, or a coupon.

* * * * *